Fig. 1

INVENTORS
Lee Nutting
George S. Chong
Attorneys

Fig. 3A

United States Patent Office 3,361,572
Patented Jan. 2, 1968

3,361,572
CONTINUOUS PROCESS FOR PRODUCING
BEVERAGE EXTRACT
Lee Nutting, Berkeley, and George S. Chong, Kensington, Calif., assignors to Hills Bros. Coffee Inc., San Francisco, Calif., a corporation of California
Filed Feb. 3, 1964, Ser. No. 342,043
15 Claims. (Cl. 99—71)

ABSTRACT OF THE DISCLOSURE

A continuous method for recovering soluble coffee extract from roast ground coffee in successive stages of concurrent aqueous extractions, first at atmospheric pressure and then at higher pressure. The aqueous extracting media flows countercurrent to the coffee feed, although each stage is concurrent. Feed water first washes multiple-extracted grounds to pick up residual coffee values, then serves to extract soluble components in the pressure stage or stages and finally extracts in the atmospheric stage or stages to give the final aqueous extract.

---

This invention relates generally to a continuous process for producing a substantially dry soluble beverage product or concentrate, and more particularly to a continuous process for producing coffee extract.

Coffee manufacturers have long sought to obtain a product which when reconstituted with water, was indistinguishable from a freshly brewed coffee. However, all known processes for producing instant coffee fail to sufficiently preserve the subtleties of taste and aroma which characterize the freshly brewed beverage.

Although a variety of processes have been developed over the years for the commercial production of soluble coffee, nearly all such processes have in common the batch extraction of ground roasted coffee, followed by separation of the grounds and drying of the resultant extract to recover the dissolved solids as a finely divided extract material. It is significant that, to date, not one truly successful "continuous" process has been developed by which controlled conditions of time, temperature, pressure and other process variables could be continuously maintained. The so-called "continuous" processes presently known in the coffee art generally involve the use of a battery of extractors, one or more of which is always being dumped or loaded while the others are on the line. Apart from substantial labor requirements, inconvenience and related problems associated with these essentially batch processes, such methods have proved incapable of providing the desired measure of control over process factors related to extraction efficiency, flavor, and aroma, to make them entirely satisfactory for the intended purpose. Moreover, batch processes generally require the use of cracked coffee beans rather than ground coffee, to insure satisfactory operation of the batch percolators and related equipment. The coffee processor is consequently limited in his choice of starting materials, in the use of his equipment, and ultimately in his efforts to obtain optimum results.

The continuous process of the present invention tends to eliminate the undesirable features of known "batch" processes for producing instant coffee extract.

Our new concept, embodied in the continuous process of the present invention, effects a maximum extraction of coffee values from the original roasted coffee throughout the manufacturing process while retaining maximum taste and aroma constituents. It also permits a commercial operation wherein essential conditions of time, temperature, pressure, and throughput volume of extract liquid in relation to roasted coffee solids can be optimally adjusted to insure the most successful commercial operation. Our new process provides the further advantage of extreme flexibility in the use of processing equipment, and thus facilitates the ready adjustment of such equipment to optimum conditions for various coffee types or blends. For example, we have particularly found that our new process can be employed to obtain a dried soluble concentrated coffee extract in a far more efficient manner than the conventional batch processes employed heretofore.

It is accordingly an object of this invention to provide a continuous process by which all the essential coffee values may be separated from roast ground coffee in a rapid, controlled, economical manner, and in high yield.

Another object of the invention is to provide a continuous countercurrent process for producing a beverage extract of roast ground coffee wherein the coffee is treated with aqueous liquid in a series of concurrent extraction operations.

Another object of the invention is to provide a continuous process of such character making use of aqueous slurries wherein the roast ground coffee is dispersed in treating or extraction liquids.

A further object of the invention is to provide an improved process for producing a beverage product of such character, wherein undesirable flavor components are continuously removed and desirable flavor components are continuously restored to the end product.

Other objects and advantages of the invention will appear from the following description in which the preferred embodiment has been set forth in detail in conjunction with the accompanying drawings, in which:

Broadly, our new process for treating roast ground coffee to obtain a beverage extract makes use of a continuous, substantially countercurrent flow of process materials, involving a series of successive extraction operations or steps. In a particularly satisfactory embodiment of the invention, four such extraction operations or steps can be utilized. In the first step, fresh roasted ground coffee is extracted at atmospheric pressure with a coffee extract obtained from previously extracted roast coffee grounds. In the second step, the grounds are washed and again extracted at atmospheric pressure with a pressure extract obtained from previously extracted coffee grounds. In the third step, the twice extracted grounds are contacted under controlled conditions of temperature and pressure with water which has been in previous contact with spent coffee grounds. Finally, the resulting spent coffee grounds are contacted with fresh feed water in a washing operation.

We have found that these continuous operations or steps are best carried out in concurrent extraction phases or unit operations wherein the coffee ground are dispersed in and move with the aqueous extraction liquids in the form of gently agitated, aqueous slurries. We have also found that extraction efficiencies can be somewhat improved through use of additional extraction steps. By way of illustration, further pressure extraction and washing steps can be advantageously employed. In general, however, an optimum balance between product quality and yield is obtained through use of our extraction steps, as outlined above.

More specifically, as related to the flow of aqueous extraction liquid, our continuous process involves a series of distinct operations or steps which can be summarized as follows:

Contacting the spent coffee grounds from previous processing with feed water in a concurrent washing operation.

Separating and discharging the spent grounds from the wash water.

Contacting previously washed and extracted coffee grounds with the wash water, in a concurrent extraction operation at elevated temperature and pressure.

Separating the resulting spent coffee grounds.

Contacting previously extracted coffee grounds with the foregoing pressure extract in a concurrent extraction and washing operation at atmospheric pressure.

Separating the washed extracted coffee grounds for further use in the processing.

Contacting fresh roast ground coffee with the foregoing wash liquor and pressure extract in a further concurrent extraction operation at atmospheric pressure.

Separating the freshly extracted coffee grounds for further use in the processing.

Processing the resultant extract liquid (e.g., concentrating or drying) to obtain the desired coffee extract product.

In the continuous processing of the present invention, the above general operations or phases are carried out as well defined and separate stages in which time, temperature and throughput volume of extraction liquid in relation to coffee solids can be optimally adjusted to insure the most successful operation. Moreover, although the process materials generally flow in countercurrent fashion, individual extraction phases or steps are carried out as essentially concurrent operations, providing extreme flexibility to the overall processing and permitting use of various conventional techniques for flavor stabilization and recovery, concentration and/or drying of the final aqueous extract.

An important aspect of this invention is the discovery that extraction of desired coffee values from roast ground coffee can be obtained in a rapid, controlled, economical manner, and in higher yield through use of aqueous dispersions or slurries of the roast ground coffee with extraction liquids. Thus, the initial extraction of essential coffee values, in successive extraction stages at atmospheric pressure, can be best carried out by forming the roast coffee grounds into aqueous dispersions or slurries with the extract liquids at the desired extraction temperatures. In like fashion additional coffee values can be obtained from the extracted coffee grounds by movement of these grounds in the form of aqueous dispersions or slurries with wash water or other extraction liquid through one or more pressure extraction steps, at controlled conditions of heat and pressure. Finally, the slurry technique has proved beneficial in the washing operation wherein the spent coffee grounds are washed in aqueous dispersion or slurry with entering feed water to thereby extract and retain residual coffee values.

Figure 1:
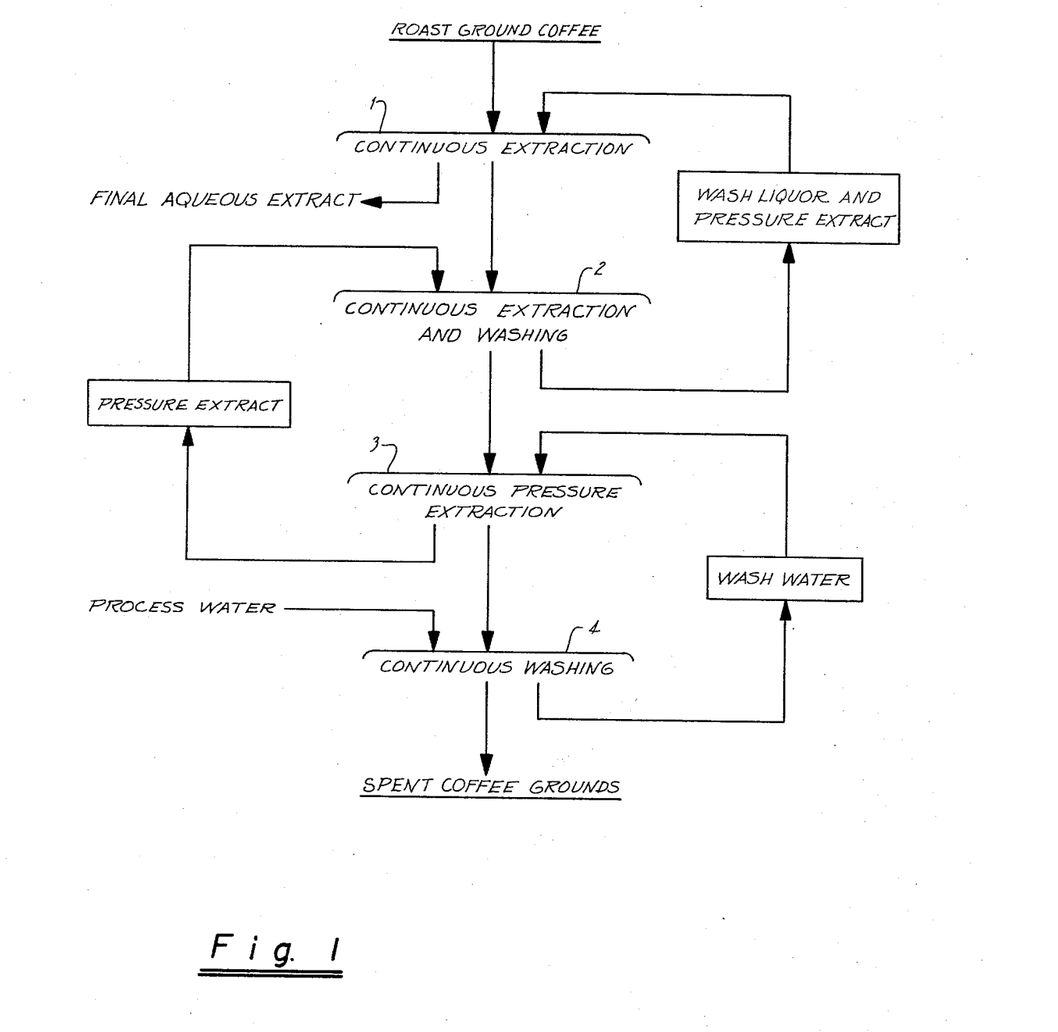
FIGURES 1 and 2 are flow sheets illustrating the general method of carrying out our continuous processing, with specific reference in FIGURE 1 to treatment of the roast ground coffee and in FIGURE 2 to the flow of extraction liquid.

Referring to the drawings, FIGRUE 1 represents a general flow sheet of our new process, and particularly illustrates the main steps in the continuous sequence.

In step 1, freshly roasted ground coffee is initially extracted at atmospheric pressure, and at a temperature which is preferably optimum for brewing and flavor development. For most coffee blends, this optimum ordinarily occurs at a temperature of the order of 180° F., although satisfactory results are obtained at temperatures ranging from about 170° F. to about 205° F. As will be apparent in FIGURE 1, the extraction in step 1 is carried out with the countercurrent flow of process water which has previously passed through washing and pressure and atmospheric extraction stages.

In step 2, the freshly extracted grounds are washed and again extracted at atmospheric pressure at substantially the temperature employed in step 1. This step is carried out with process water which has initially contacted with the spent grounds, and which has thereafter passed with the previously extracted grounds through a pressure extraction step.

In step 3, the twice extracted grounds are subjected to continuous extraction at elevated temperature and pressure in a pressure extraction step. This step is optimally carried out at a temperature of the order of 360° F. and under a pressure of the order of 140 p.s.i.g. However, highly satsifactory results have been obtained at pressures ranging from 75 to 225 p.s.i.g., and at temperatures ranging from 320° to 400° F. During the extraction under pressure in step 3, additional coffee values are derived by the extraction liquid, which passes on to the extraction stages 1 and 2.

In step 4, the spent grounds from the pressure extraction are continuously washed with the entering process water, which removes residual coffee values from the spent grounds. In general, best results are obtained in the washing operation if the water has been heated to a temperature not higher than 185 to 190° F., although preheating is not absolutely essential.

Figure 2:
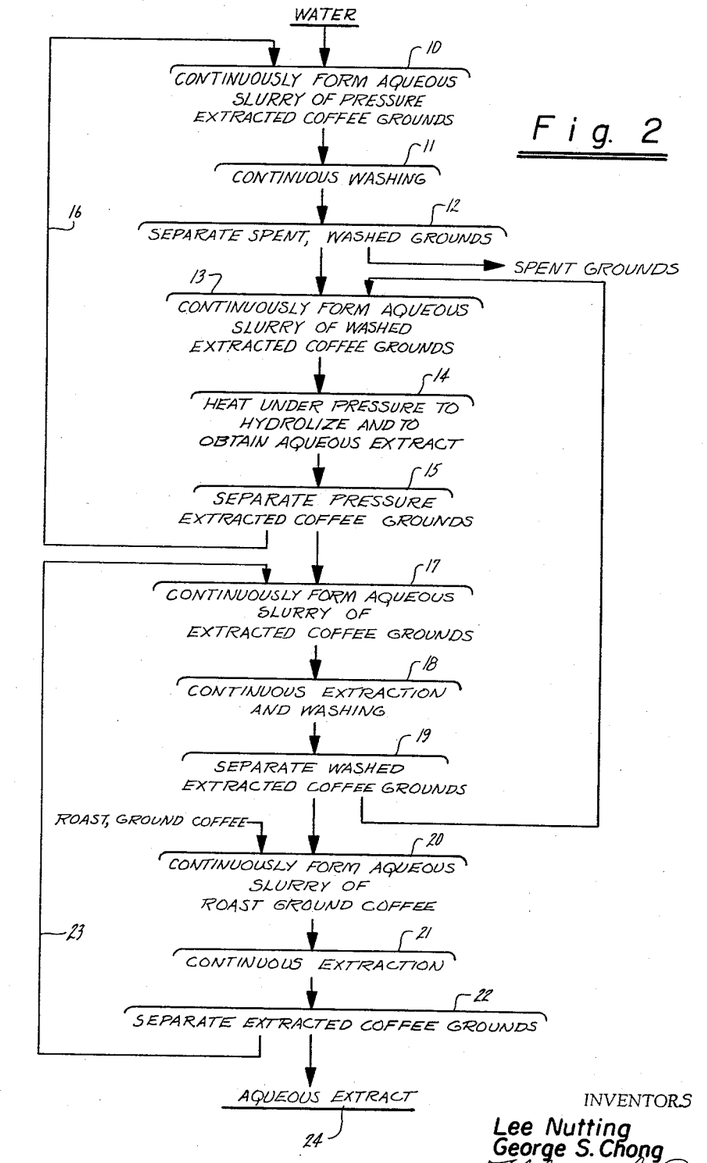

In FIGURE 2, a flow sheet is given illustrating the continuous processing of our invention as related to the flow of extraction liquids. Thus, in step 10, the feed water is continuously mixed with the spent grounds discharged from the prior extraction treatments of the coffee grounds, to form an aqueous dispersion or slurry. In step 11 the spent grounds are washed in a concurrent washing step to remove residual coffee values. This step corresponds to the washing step (i.e., step 4) in FIGURE 1 Following separation of the spent washed grounds in step 12, the wash liquid is mixed with previously extracted roast ground coffee to form a further aqueous dispersion or slurry, in step 13. In step 14, this aqueous slurry is heated under pressure to hydrolyze the coffee grounds and thereby obtain an aqueous pressure extract. Step 14 thus corresponds to step 3 in FIGURE 1. The spent grounds are then separated in step 15 for further use in the processing as generally represented by the arrow 16. The extract liquid from the pressure extraction (step 14) is then mixed with previously extracted roast ground coffee, in step 17, to again form an aqueous dispersion or slurry. This slurry is heated in a concurrent extraction and washing step 18 to a desired extraction temperature (i.e., about 180° F.) to obtain an extract based on partially extracted roast ground coffee. The extracted grounds are next separated in step 19, and the extract mixed with the entering roast ground coffee, in step 20, to form a further aqueous dispersion or slurry of fresh roast ground coffee. This slurry is likewise heated in step 21 to the desired extraction temperature (about 180° F.) to obtain the final extract based on the fresh roast ground coffee. It may be noted that the sequence of heating prior to extraction in steps 18 and 21 is not critical, and in actual practice of the invention, it has proved advantageous to preheat the extraction liquids prior to the mixing in steps 17 and 20 to form an aqueous slurry. It is also contemplated that the roast coffee introduced to step 20 may be preheated or be introduced at desired temperature directly from the roaster. Following this processing, the extracted roast coffee grounds are separated, in step 22, for return to the processing (arrow 23). The final aqueous coffee extract (indicated at 24) may be utilized as is, concentrated, or dried to produce a dried coffee extract.

From the foregoing general description of the processing, and from the specific description hereinafter presented, it will be apparent that the final aqueous coffee extract contains all the esssential coffee values normally obtained plus residual and pressure extracted values derived as an added benefit from the continuous processing. It will also be apparent that the desired coffee extract achieved by the processing will be enriched in these coffee values, and therefore will be produced in higher yield than normally obtained in commercial extraction procedures. By way of illustration, we have found that the yield of dried coffee extract from our continuous processing is approximately 25 to 35% greater than obtained with conventional batch processing.

Figure 3A:
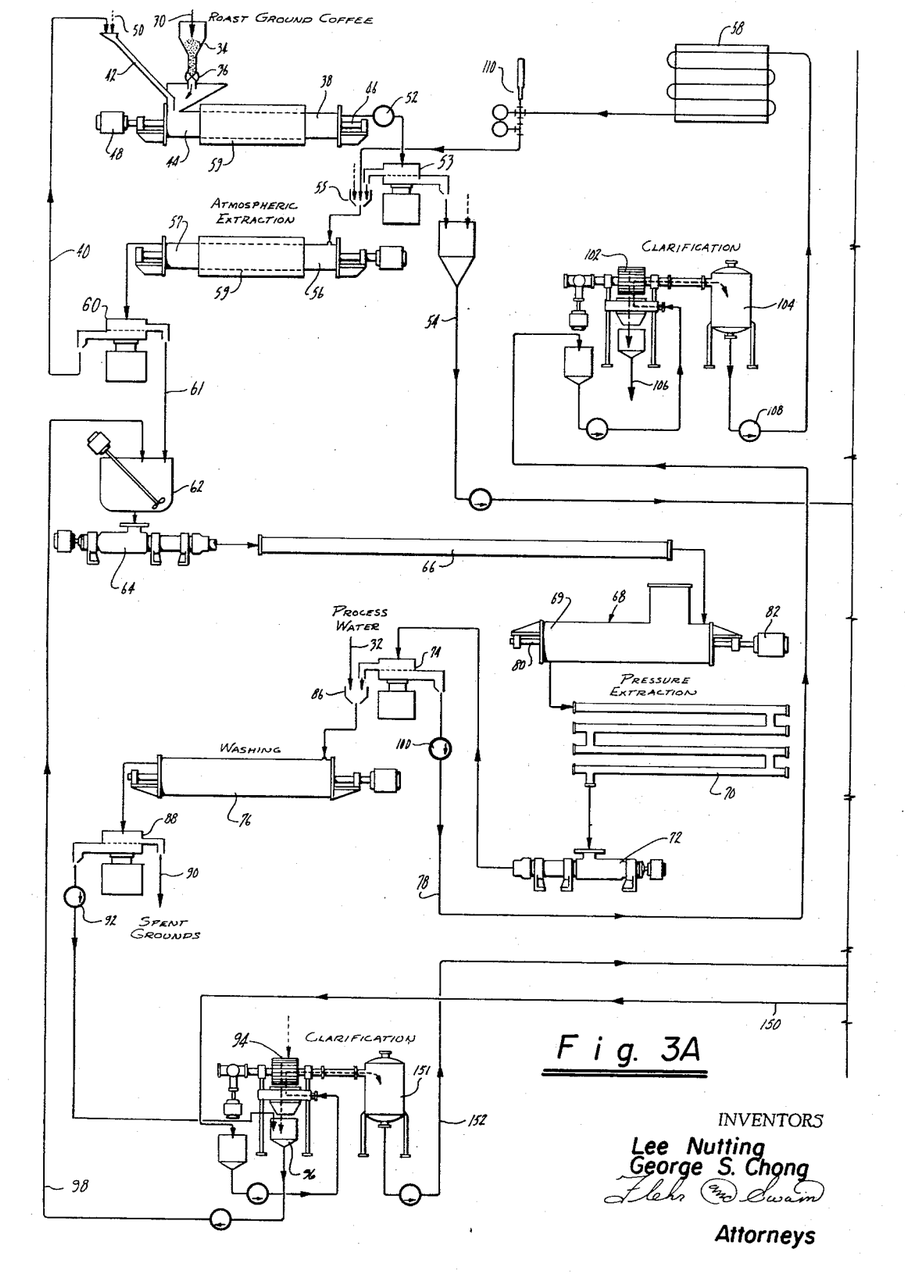
FIGURES 3A and B form a schematic representation of a system of apparatus which may be used in carrying out the continuous processing in accordance with our invention.
Figure 3B:
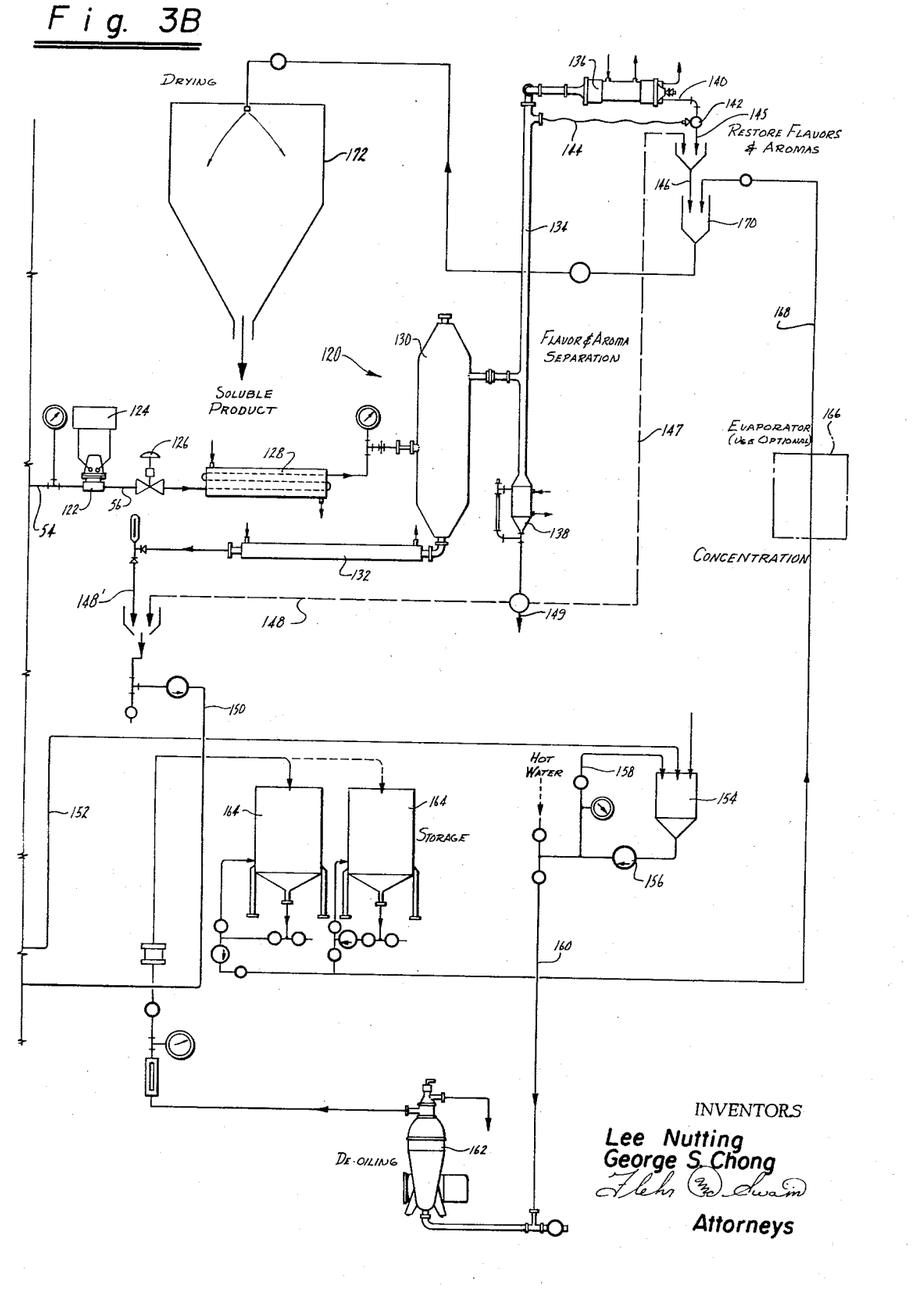

FIGURES 3A and B schematically illustrate a system of apparatus for carrying out our continuous process, and additionally illustrate certain refinements in the processing to achieve the most efficient extraction of coffee values while retaining taste and aroma constituents in substantially unimpaired form. As previously indicated, the processing is generally countercurrent, with the roast ground coffee entering the system at 30, and the process water entering at 32. However, the coffee grounds flow concurrently with the extraction liquids (in the form of gently agitated aqueous slurries) through the various extraction or operating phases of the process. With respect to the movement of coffee grounds, the main operating phases are indicated in FIGURE 3A to be an initial atmospheric extraction phase, a subsequent pressure extraction phase, and a final grounds washing phase. The illustrated operating phases generally correspond to the steps in the processing, outlined in FIGURE 1. Since these operating phases rely on circulation of the coffee grounds in the form of aqueous slurries, the apparatus employed in the separate operations or phases can be similar in general construction, for example, elongated treating vessels through which the slurries pass under a suitable hydrostatic or pressure head. Agitation means can also be employed within the various treating chambers to maintain the grounds and liquid phases in the desired slurry form.

Referring specifically to FIGURE 3A, fresh roast ground coffee is introduced to the system at 30 through a suitable feed hopper 34 and proportioning device 36 to a first atmospheric treating chamber or extractor 38. Within the extractor 38 the fresh grounds are subjected to a first atmospheric extraction at a temperature of about 180° F. and in the presence of effluent liquor from the washing and pressure extraction stages. The latter enters the extractor through the line 40 and conduit 42 and effects an initial turbulent mixing with the grounds within an inlet section 44 of the extractor to form the desired aqueous slurry. The slurry is maintained as a dispersion of grounds throughout the extraction liquid passing through the extraction chamber 38 by means of paddles rotated on the through shaft 46 by the motor 48. The extraction operation thus progresses continuously as the process materials flow concurrently through the extractor 38. The rate of flow of effluent liquor (and makeup water 50) through the extractor 38 is determined by suitable pump means 52, which discharge to a liquid-solid separation unit 53. The unit 53 separates the once extracted grounds from the extract liquor, allowing the latter to pass to a discharge line 54. The grounds are then mixed and formed into a slurry with effluent liquor from subsequent washing and pressure extraction stages in the mixing tank 55 and inlet section 56 of a second extractor 57, in the manner generally described in conjunction with the first extraction unit 38. As indicated in FIGURE 3A, this influent liquor can be preheated in the heat exchange unit 58 to a desired inlet temperature, say 180 to 200° F., to obtain a desired extraction temperature (i.e., 180° F.) within separate extraction units 38 and 57. Preferably steam jackets or other suitable heating means 59 are employed to maintain desired temperatures within the units 38 and 57 during the extraction phase. In keeping with the essential countercurrent operation described herein, the extraction liquid is separated in a second liquid-solid separation unit 60 for discharge to the line 40 leading to the first extractor 38. The extracted grounds are simultaneously discharged from the atmospheric extraction phase, at 61, for movement to the pressure extraction phase. The final extract liquor from the atmospheric extraction phase simultaneously passes through the line 54 for subsequent processing to produce the final coffee extract product.

The extracted grounds are next mixed in a slurry tank 62 with the effluent liquor from the washing phase to disperse the grounds and form a further aqueous slurry. This aqueous slurry is fed continuously to a high pressure feed pump 64, which discharges the slurry under pressure through a preheating unit 66, pressure extractor 68, cooling unit 70, and discharge pump 72. The latter cooperates with the feed pump to maintain a desired pressure in the pressure extractor 68 (about 75 to 225 p.s.i.g.). The function of the heat exchange unit 66 is to facilitate maintenance of temperature conditions within the pressure extractor 68 by preheating the slurry to achieve a temperature of the slurry entering the pressure vessel within the range of from about 320 to 400° F., to effect a maximum extraction efficiency within the pressure system. We have found, for example, that very satisfactory results can be obtained at a pressure of the order of 140 p.s.i.g. and a temperature of 360° F. During this operation, the slurry in the extraction chamber 68 is gently agitated by the rotary paddle shaft 80 driven by the motor 82 to maintain the grounds in dispersed form. Desired temperatures for the pressure extraction phase are maintained by either insulation or steam jacketing 69 or other suitable heat exchange means associated with a pressure extraction vessel. The intermixed spent grounds and pressure extract liquid leaving the pressure chamber are cooled in the heat exchange unit 70 to a temperature (e.g., 180 to 190° F.) suitable for discharge to the washing phase. Preferably, the slurry discharged by the pump 72 is fed to a further liquid-solid separating unit 74 which effects discharge of the spent grounds to the washer 76, and a separate discharge of the pressure extract liquid through the line 78 leading to the atmospheric extraction phase.

Following the pressure extraction phase, the spent extracted grounds are mixed with the process water entering at 32 in a mixing tank 86, and the resulting aqueous dispersion or slurry fed to the washer unit 76 under suitable hydrostatic head. The slurry moves through the unit 76 in the manner previously described to effect a thorough washing of the spent grounds. During this operation, the process water dilutes and removes residual coffee values remaining in the spent grounds. The slurry discharged from the washer 76 is separated in the unit 88, with the spent grounds being discharged at 90, and the wash liquid passing in countercurrent fashion to the pressure and atmospheric extraction phases described above.

So far, the use of the apparatus in the processing has been described with particular regard to the movement of coffee grounds. However, from the standpoint of the ultimate product produced, it is desirable to trace the flow of process water through the system of apparatus.

As indicated, the process water first effects washing of the spent grounds in the washer 76 to remove residuals and coffee values. It is then separated from the spent grounds in the separation unit 88 and conveyed by the pressure pump 92 to an extract clarification unit 94 where it picks up partially extracted fine coffee grounds or process "muds" separated from the final aqueous extract from the atmospheric extraction phase. These fines or "muds" have a particle size below about 300 microns, and therefore tend to pass through the screening units employed in the various liquid-solid separation units along with the extraction liquid phase. As indicated in FIGURE 3A, these process "muds" are mixed with the wash liquid in the tank 96 and flow with the wash liquid in the form of a fine suspension through the line 98. The muddy inflow through this line thus contains all the residual coffee values derived from the washing of the spent grounds and the intermixture with the "mud" at the extreme upstream end of the coffee grounds movement.

The muddy inflow from the clarifier 94 is next mixed with the extracted grounds from the atmospheric extraction phase in the slurry tank 62. The pressure extraction phase in the pressure units 66, 68 and 70 is thus carried out with an aqueous extraction liquid containing the residual coffee values from the washing phase. Following the pressure extraction operation and separation of spent grounds at 74, the muddy pressure extract is passed through the line 78, by means of the pump 100, to a second clarification unit 102. Here the fine spent coffee grounds, or "muds" are removed from the aqueous extract, prior to passage of the latter to the atmospheric extraction phase. Although the clarification unit 102 (and the unit 94) can be of any suitable type, the illustrated apparatus comprises a rotary filter drum maintained under internal vacuum. The aqueous phase thus passes to the interior of the filter drum and into the vacuum tank 104 for movement to the subsequent extraction operations. The "muds," which form a filter cake on the exterior of the drum, are periodically discharged from the system as indicated by the arrow 106. The clarified pressure extract liquid is next passed to the pre-heater 58 for the atmospheric extraction unit by means of pump 108. In the preheater the aqueous mixture of pressure extract and residual coffee values is heated to the desired temperature for the atmospheric extraction phase (monitored by the control unit 110), and passes to the slurry tank 55 for the second atmospheric extractor 57. In the extractor 57, the liquid mixture effects an extraction of the entering roast coffee, previously extracted in the first extractor 38. The extract liquid now passes through the line 40 in the manner previously described to form a slurry with entering fresh roast ground coffee, at 44, following which it effects an initial extraction of the entering coffee in the extractor 38. The final aqueous extract from the atmospheric extraction phase is separated in unit 53, and passes through the discharge line 54 for further processing to achieve the final extract product.

As previously noted, the aqueous extract obtained from the atmospheric extraction phase, i.e., extractors 38 and 57) contains a substantial quantity of partially extracted fine coffee grounds or process "muds" which tend to flow with the extraction liquid phase. In accordance with the present invention, these process "muds" could be immediately separated in the clarification unit 94, and the extract liquid subjected to drying to produce a dried extract product. However, in a preferred practice of the invention, the extract liquid is subjected to simultaneous processing to remove the volatile flavor and aroma components, to concentrate, de-oil, or otherwise process the nonvolatile extract, and to recombine all or part of the volatile components with the extract prior to spray drying to produce the desired soluble coffee product.

Referring specifically to FIGURE 3B, the final extract liquid in line 54, is fed to a flavor and aroma separation phase, generally represented at 120. As illustrated, the flow of extract liquid is regulated by a suitable differential pressure sensing unit 122, controller 124, and flow control valve 126. The entering extract is next preheated in a suitable heat exchange unit 128, following which it is passed to a vapor-liquid separator or flash tank 130 to effect an initial separation of the volatile flavor and aroma components. The conditions in the vapor-liquid separator are carefully controlled to insure desired evaporation of a major portion of the volatile flavor and aroma components without production of discernible changes in color or flavor. The main extract passes from the bottom of the flash tank 130 to a suitable heat exchange unit 132 to effect cooling of the nonvolatilized extract. The volatile components pass to a packed reflux or fractionating column 134, which operates in conjunction with a condenser unit 136 and a reboiler unit 138 which maintains the column in operation. The discharge line 140 from the condenser is provided with a proportioning valve 142 and return line 144 by which essence-enriched condensate is returned to the top of the fractionating column. The valve 142 can be controlled to maintain a suitable reflux ratio of flavor concentrate and recovery of the condensed volatile fraction through the line 146. In general, the flavor recovery unit can be of conventional design, for example, as described in Milleville Patent 2,457,315, or by Walker and Patterson in the February 1957 issue of "Food Technology." In a typical operation, the conditions in the flush tank 130 are such that the major proportion of the volatile components are removed by evaporation of from 5 to 30% of the extract liquid.

As indicated in FIGURE 3B, the recovered flavor and aroma components can be directly restored to the extract liquid (arrow 145), or, alternatively, can be mixed with the bottoms from the reflux column 134 (arrow 147) prior to restoration to the extract. In a further variation, the bottoms from the reflux column can be first mixed with the main effluent extract from the flash tank (arrows 148, 148') or they can be discharged from the system (arrow 149).

The separated extract liquid is next pumped through the line 150 to the clarification unit 94, where the fine coffee grounds or process "muds" are separated for admixture with the wash water flowing through the pressure extraction phase. The clarified extract liquid is then pumped from the vacuum tank 151 of the clarifier through the line 152 to a mixing tank 154. The extract can now be passed at a desired pressure in line 160 (determined by the pump 156 and pressure relief line 158) to the centrifuge unit 162, where it is de-oiled, and to suitable storage tanks, represented by the tanks 164. As needed, the clarified, de-oiled extract is pumped to conventional evaporating units 166 where it can be concentrated, or, alternatively, the extract can be delivered directly to the drying operation through the line 168. Just prior to the drying operation, the extract is mixed in proper proportion with the recovered flavors and aromas, at 170, following which the extract can be dried in conventional fashion in a spray drying unit 172 to produce the final soluble beverage product.

In the processing of FIGURE 3, a single pressure extraction stage is employed in conjunction with a two stage extraction at atmospheric pressures. However, the invention is not limited to any particular number of pressure or atmospheric extraction stages, and one or more extraction stages can be used in each instance with satisfactory results. We have particularly found that two extractions at atmospheric pressure, followed by two pressure extraction stages, provide a highly successful arrangement. Processing according to this arrangement is generally illustrated in diagrammatic form in FIGURE 4, which also provides a simplified representation of the overall process carried out by the system of apparatus schematically illustrated in FIGURES 3A and B.

Figure 4:
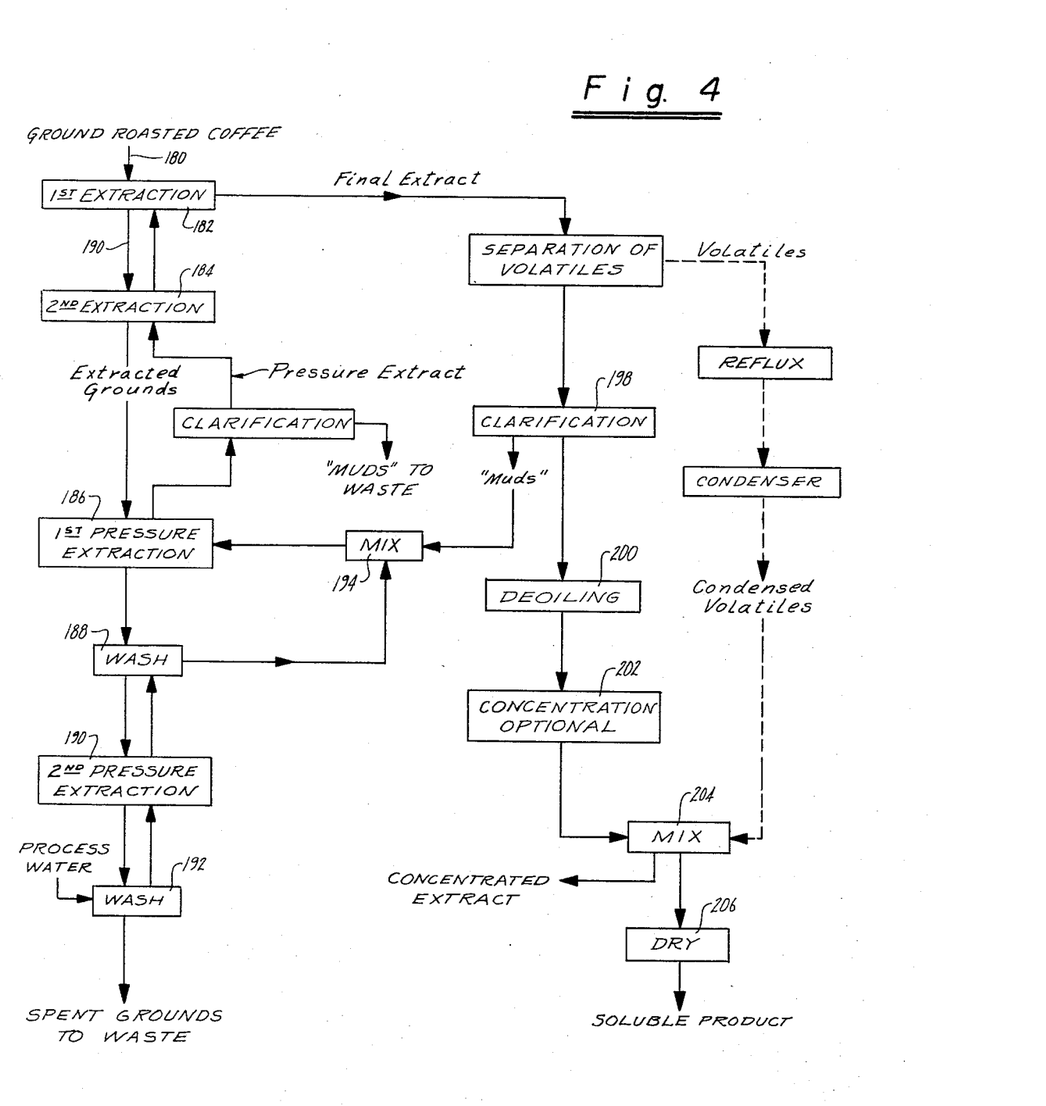
FIGURE 4 is a diagrammatic flow sheet generally related to the foregoing system of apparatus, but illustrating a slight variation in the processing.

Referring to FIGURE 4, the roast ground coffee enters the system at 180, and is subjected to aqueous extraction in countercurrent fashion at atmospheric pressures, including a first extraction stage at 182 and a second extraction stage at 184. Thereafter the extracted grounds are subjected to a first pressure extraction at stage 186, in the presence of aqueous extract liquid containing process "muds" derived from the atmospheric extraction stages. The spent grounds are then washed at 188 and subjected to a second pressure extraction at stage 190, following which the spent grounds are washed at 192 and discharged from the system.

The process water in turn first contacts the grounds in the washing operation at 192, following which it proceeds in generally countercurrent fashion through the second pressure extraction stage 190, wash operation at 188, and a mixing operation at 194 where it picks up the process muds from the initial aqueous extraction stages. The muddy extract liquid then flows through the first pressure extraction stage at 186, following which the muds are separated and discharged from the system. The resultant pressure extract then passes in generally countercurrent fashion through the second atmospheric extraction stage 184, and first extraction stage 182, where most of the desired coffee values are removed from the entering roast ground coffee to produce the final aqueous extract.

In the processing of FIGURE 4, and specifically throughout each of the atmospheric extraction operations at 182 and 184, pressure extraction operations at 186 and 190, and the washing operations at 188 and 192, the extract liquids and coffee grounds move concurrently in dispersed slurry form to thereby insure a desired prolonged intimate contact of the grounds and extract liquids consistent with maximum extraction efficiencies. The final extract obtained from the first extraction stage 182 can be immediately subjected to clarification to remove the fines or "muds." Alternatively, it is subjected to processing to separate the volatile flavor and aroma components, as in the schematic flow sheet of FIGURES 3A and 3B. In general, the remaining operating stages shown in FIGURE 4 can be identical to those described in FIGURE 3B, wherein the nonvolatilized extract is clarified at 198 to separate the process muds, de-oiled at 200, and concentrated at 202 prior to mixing with the condensed volatile components at 204. Following mixing, the concentrated extract with restored flavor and aroma components can be discharged as a concentrated extract, or preferably, dried at 206 to produce a dried soluble beverage product.

In a typical operation according to our continuous process, and employing the system of apparatus generally disclosed in FIGURES 3 and 4, the operating conditions can be as follows:

Roast ground coffee is introduced at 30 at a rate of 1.78 pounds per minute. Process water is simultaneously introduced at 32 at the rate of 1.02 gallons per minute. In the atmospheric extraction phase, the extraction liquid is preheated in the heat exchange unit 58 to a temperature of 190° F. to achieve an approximate inlet temperature to the second atmospheric extraction stage of 180° F. This temperature is maintained in the second stage extraction 57 and in the first stage extraction 38 by steam jacketing 59. The length of the extraction chambers 38 and 57 and the indicated rates of flow are such that the concurrent flow of extraction liquid and roast coffee grounds remains within each stage (in the form of gently agitated aqueous slurries) for a period of approximately 10 minutes. In the pressure extraction stage (extractor 68) the aqueous slurry of previously extracted grounds and muddy inflow of wash liquid is introduced at a pressure of 140 p.s.i.g. and a temperature of 360° F. The flow rates through the pressure extractor again achieve an extraction period of approximately 10 minutes duration. Where a second pressure extraction stage is used (190 in FIGURE 4), identical extraction pressures, temperatures and flow rates can be employed. The cooling unit 70 reduces the temperature of the resulting aqueous slurry to approximately 180° F., which temperature is maintained as the grounds pass into the washing units. If desired, the process water entering at this stage can be preheated by a heat exchange unit (not shown) to a temperature of about 185 to 190° F. The clarification unit 94 is operated at a vacuum of approximately 5 to 14 inches at vacuum within the filter drum, whereas the final clarification unit is operated at 5 to 9 inches vacuum. The final aqueous extract from the atmospheric extraction phase is introduced to the liquid-vapor separator 130, to effect separation of the flavor and aroma components, at a rate of approximately 0.87 gallon a minute and at a temperature of approximately 250° F. The liquid extract is discharged from the bottom of the separation unit 130 at a temperature of 195° F. The condensate is simultaneously passed to the proportioning valve 142 at a temperature of approximately 85° F. The ratio of condensed volatiles returned to the reflux column through the line 144, with respect to the proportion passing to the mixing tank 170, is approximately 1:1. De-oiling is carried on in conventional fashion, and the de-oiled clarified extract passed to storage tanks 164 at a rate of 0.66 gallon per minute. Prior to spray drying, the extract liquid can be evaporated in the unit 166 to achieve a desired concentration, following which the condensed volatile flavor and aroma constituents are restored to the extract liquid at a ratio of approximately 1:1. Spray drying is accomplished within the unit 172 at an air inflow of approximately 600 cubic feet per minute, preheated to a temperature of 440° F. The final soluble dried product is discharged at a temperature of about 185° F. and at a rate of 0.6 pound per minute.

The dried soluble coffee product produced by the above continuous processing was found to be higher in aroma than commercially available soluble coffee products produced by conventional batch processes. It also possessed an enhanced flavor. In addition, the processing has proved particularly advantageous in that the processing conditions can be easily controlled, extraction efficiencies and yields are improved, and the processing in every case produces a final product having enhanced flavor and aroma, as well as improved shelf life and storage characteristics.

Many variations are possible in the processing herein described, and in the use of the exemplary systems of apparatus disclosed. For example, it may be desirable in some instances to carry the process "muds" from the atmospheric extraction phase through all the various stages of the pressure extraction phase, as in FIGURE 4. De-caffeination processing may also be employed. For example, the teachings of Nutting Patent 2,802,739 might be adapted with slight modification to a continuous decaffeinating step, applied to the main liquid extract discharged from the bottom of the vapor-liquid separator 130 and cooler 132, or at any other convenient point. Decaffeination would therefore be carried out prior to the restoration of flavors and aromas through line 146. Many other variations will similarly occur to those skilled in this art, and can easily be adapted to the disclosed continuous process and system of apparatus without changes in the overall concept of the processing. Accordingly, it should be understood that the disclosures herein are intended as purely illustrative, and not in any sense limiting.

We claim:

1. In a continuous process for treating roast ground coffee to obtain a beverage extract wherein the roast coffee is contacted in substantially countercurrent fashion with aqueous extraction liquid in successive extraction steps; an atmospheric pressure extraction phase carried out at a temperature below that which would adversely affect the final extraction product wherein freshly roasted ground coffee and aqueous extraction liquid move concurrently in dispersed slurry form to obtain a desired intimate contact of the roast ground coffee and extraction liquid; a greater than atmospheric pressure extraction phase wherein previously extracted roast ground coffee and aqueous extraction liquid move concurrently in dispersed slurry form likewise to insure the desired intimate contact of the extracted roast ground coffee and aqueous extraction liquid; said aqueous extraction liquid moving successively through said greater than atmospheric pressure and atmospheric pressure extraction phases to produce a final aqueous extract suitable for concentrating or drying.

2. In a continuous substantially countercurrent process for producing a beverage extract from roast ground coffee, the steps of intermixing and dispersing previously extracted roast ground coffee with aqueous extract liquid to form an aqueous slurry and moving the same in at least one concurrent extraction step at elevated temperature and pressure to obtain an aqueous pressure extract, and thereafter intermixing and dispersing fresh roast ground coffee with said pressure extract to form a second aqueous slurry and moving the same in at least one concurrent extraction step at atmospheric pressure to obtain an aqueous extract product, said last-named extraction step being carried out at a temperature below that which would adversely affect the final extraction product.

3. A process as in claim 2 wherein spent coffee grounds from said extraction at elevated temperature and pressure are intermixed and dispersed in feed water to form an initial aqueous slurry and moved therewith in at least one concurrent washing step adapted to recover residual coffee values, said residual coffee values being retained in said aqueous extract product.

4. In a continuous, substantially countercurrent process for producing a beverage extract from roast ground coffee wherein aqueous liquid is passed through progressively extracted roast coffee in a series of concurrent extraction operations, the successive steps of intermixing and dispersing spent extracted roast coffee grounds in water in an aqueous slurry washing step to remove residual coffee values therefrom, intermixing and dispersing previously extracted roast ground coffee with said wash water in an aqueous slurry extraction step at an elevated temperature and pressure to obtain an aqueous pressure extract of said previously extracted coffee, and intermixing and dispersing freshly roasted ground coffee with said aqueous pressure extract in at least one aqueous slurry extraction step carried out at atmospheric pressure and at a temperature sufficiently elevated to obtain a final aqueous extract but below that which would adversely affect the final extraction product, whereby said final extract contains an extract of freshly roasted ground coffee as well as residual and pressure extracted coffee values.

5. A process as in claim 4 wherein said aqueous slurry extraction to obtain an aqueous pressure extract is carried out at a temperature of the order of 320° to 400° F. and at a pressure of the order of 75 to 225 p.s.i.g.

6. A process as in claim 4 wherein said final aqueous extract is subjected to clarification to remove process muds in the form of fine roast ground coffee, and said process muds are mixed with the wash liquid used to form said second aqueous slurry.

7. In a continuous, substantially countercurrent process for producing a beverage extract from roast ground coffee wherein aqueous liquid is passed through progressively extracted roast coffee in a series of concurrent extraction operations, the successive steps of intermixing and dispersing spent extracted roast coffee grounds in water in an aqueous slurry washing step to remove residual coffee values therefrom, intermixing and dispersing previously extracted roast ground coffee with said wash water in an aqueous slurry extraction step at a temperature of the order of 320° to 400° F. and at a pressure of the order of 75 to 225 p.s.i.g. to obtain an aqueous extract of said previously extracted coffee, and intermixing and dispersing freshly roasted ground coffee with said aqueous pressure extract in at least one aqueous slurry extraction step carried out at atmospheric pressure and at a temperature of the order of 180° F., whereby said final extract contains an extract of freshly roasted ground coffee as well as residual and pressure extracted coffee values.

8. In a continuous process for producing a beverage extract from roast ground coffee, the successive steps of intermixing and dispersing spent extracted roast coffee grounds in water to form an aqueous slurry, causing said slurry to move in a concurrent washing operation to effect removal of residual coffee values from said spent grounds, separating and removing the spent washed coffee grounds, intermixing and dispersing previously extracted roast coffee grounds in the wash liquid from said washing operation to form a second aqueous slurry, causing said second aqueous slurry to move in a concurrent extraction operation while subjecting the same to elevated temperature and pressure to thereby obtain an aqueous pressure extract of said previously extracted coffee, separating the resulting spent grounds from said pressure extract, intermixing and dispersing previously extracted coffee grounds in said pressure extract to form a third aqueous slurry, causing said third aqueous slurry to move in a concurrent washing and extraction operation while at elevated temperature and atmospheric pressure to thereby obtain an aqueous extract of previously extracted coffee grounds, intermixing and dispersing fresh roast ground coffee in said aqueous extract to form a fourth aqueous slurry, causing said fourth slurry to move in a concurrent extraction operation while at elevated temperature and atmospheric pressure to thereby obtain a final aqueous extract, said last-named extraction step being carried out at a temperature below that which would adversely affect the final extraction product, separating the extracted coffee grounds from said final aqueous extract, separating volatile extract components from said final aqueous extract, condensing said volatile components, removing excess water from the remaining aqueous extract to concentrate the same, and recombining the condensed volatile components with the concentrated aqueous extract to form a final desired concentrated coffee extract.

9. A process as in claim 8 wherein said volatile extracted components are continuously separated at least in part by means of fractional distillation.

10. In a continuous substantially countercurrent process for treating roast ground coffee to remove coffee values therefrom, wherein the coffee is contacted with aqueous extraction liquid in a series of successive continuous operations, the step of extracting fresh roast ground coffee in a first concurrent extraction step, said first extraction step being carried out while said coffee is intermixed and dispersed in said extraction liquid in the form of an aqueous slurry, said first extraction step being carried out at a temperature below that which would adversely affect the final extraction product, extracting the extracted roast ground coffee in a second concurrent extraction step, said second extraction step being also carried out at elevated temperature and pressure while said extracted coffee is intermixed and dispersed in the extraction liquid in the form of a further aqueous slurry, said aqueous extraction liquid passing in countercurrent fashion though said second and first concurrent extraction steps whereby coffee values are progressively removed from said roast ground coffee, and continuously separating the aqueous extraction liquid from said first concurrent extraction as a beverage product.

11. A process as in claim 10 wherein the twice extracted roast ground coffee from said second concurrent extraction step is washed and extracted in a concurrent washing step while intermixed and dispersed in entering aqueous extraction liquid in a further aqueous slurry.

12. In a continuous, substantially countercurrent process for treating roast ground coffee to obtain a beverage extract, wherein the coffee is contacted with aqueous extraction liquid in a series of continuous operations, the successive steps of extracting fresh roast ground coffee in at least one concurrent extraction step at atmospheric pressure with an aqueous extract liquid previously obtained from extracted roast coffee grounds, said extraction step being carried out at a temperature below that which would adversely affect the final extraction product and while said roast ground coffee is intermixed and dispersed in an aqueous slurry with said previously obtained extract liquid, extracting the extracted roast ground coffee at elevated temperature and pressure in at least one further concurrent extraction step with aqueous extract liquid, said further extraction step being carried out while said extracted roast ground coffee is intermixed and dispersed in an aqueous slurry with said aqueous extract liquid, said aqueous extract liquid passing in countercurrent fashion through said atmospheric and pressure extraction steps to produce a beverage extract product.

13. In a continuous, substantially countercurrent process for treating roast ground coffee to obtain a beverage extract therefrom, wherein the coffee is extracted with water in a series of continuous concurrent extractions comprising: at least one step involving the forming of a first aqueous slurry by intermixing and dispersing roast ground coffee in aqueous extract liquid obtained from previously extracted roast coffee grounds and heating said aqueous slurry as the components thereof move in concurrent flow to effect extraction of coffee values from said roast ground coffee, said heating being insufficient to raise the temperature of said slurry above that which would adversely affect the characteristics of the final extraction product, at least one further step involving the separating of extracted coffee grounds from the first aqueous slurry and forming a second aqueous slurry by intermixing and dispersing the extracted coffee grounds in aqueous extract liquid which has been in a previous contact with spent coffee grounds and heating said second aqueous slurry at elevated temperature and pressure as the components thereof move in concurrent flow to effect extraction of additional coffee values from said extracted grounds, at least one additional step involving the separating of pressure extracted grounds from the second aqueous slurry and forming a third aqueous slurry by intermixing and dispersing said pressure extracted grounds in feed water and removing residual coffee values from said pressure extracted grounds as the components thereof move in concurrent flow, discharging the grounds from said third aqueous slurry as a waste product, and separating the aqueous extract from said first aqueous slurry as a beverage extract.

14. A process as in claim 13 wherein the beverage extract from said first slurry is subsequently processed in a series of steps involving separation of volatiles, concentration of the remaining extract and return of the separated volatiles, to form a final concentrated coffee extract.

15. A process as in claim 14 wherein said concentrated coffee extract is dried to form a dried soluble coffee extract.

References Cited

UNITED STATES PATENTS

| | | | |
|---|---|---|---|
| 2,517,073 | 8/1950 | Alvarez | 99—289 |
| 2,522,014 | 9/1950 | Bacot | 99—71 |
| 2,915,403 | 12/1959 | Clinton et al. | 99—71 |
| 2,992,978 | 7/1961 | Kelly | 202—160 |
| 3,148,069 | 9/1964 | Sjogren et al. | 99—71 |

MAURICE W. GREENSTEIN, *Primary Examiner.*

A. LOUIS MONACELL, *Examiner.*